(12) United States Patent
Bechwati et al.

(10) Patent No.: US 7,215,806 B1
(45) Date of Patent: May 8, 2007

(54) ADAPTIVE ITERATIVE BONE CORRECTION IN COMPUTERIZED TOMOGRAPHY

(75) Inventors: Ibrahim M. Bechwati, Roslindale, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 657 days.

(21) Appl. No.: 10/428,053

(22) Filed: May 1, 2003

(51) Int. Cl.
*G06K 9/00* (2006.01)

(52) U.S. Cl. .................. 382/133; 382/168; 378/21

(58) Field of Classification Search ............... 382/108, 382/128, 129, 130, 131–134, 168, 203, 243, 382/254, 260, 274, 275, 285, 305; 378/196, 378/21; 600/407, 437; 73/433
See application file for complete search history.

(56) References Cited

U.S. PATENT DOCUMENTS

| | | | | |
|---|---|---|---|---|
| 5,243,664 A | * | 9/1993 | Tuy ........................... | 382/130 |
| 6,076,400 A | * | 6/2000 | Bechwati et al. ............. | 73/433 |
| 6,217,214 B1 | * | 4/2001 | Cabral et al. ................ | 378/196 |
| 6,226,393 B1 | * | 5/2001 | Grunkin et al. ............. | 382/128 |
| 6,315,445 B1 | * | 11/2001 | Mazess et al. .............. | 378/196 |
| 6,770,031 B2 | * | 8/2004 | Hynynen et al. ........... | 600/437 |
| 6,975,894 B2 | * | 12/2005 | Wehrli et al. ............... | 600/407 |

* cited by examiner

*Primary Examiner*—Seyed Azarian
(74) *Attorney, Agent, or Firm*—McDermott Will & Emery LLP (57) ABSTRACT

A method of performing bone correction on a computerized tomography (CT) image includes the steps of:

A. generating a reconstructed CT image of a bone-containing portion of a patient's body, the reconstructed CT image including a bone region corresponding to the bone-containing portion;

B. determining characteristics of the bone region of the image; and

C. performing a bone correction procedure on the image, the bone correction procedure being performed at a gain that is determined based on the bone region characteristics.

5 Claims, 11 Drawing Sheets

ADAPTIVE ITERATIVE BONE CORRECTION IN COMPUTERIZED TOMOGRAPHY

FIELD OF THE INVENTION

The present invention relates generally to computerized tomography image processing and more particularly to a method of performing adaptive iterative bone correction in computerized tomography images.

BACKGROUND OF THE INVENTION

Figure 1:
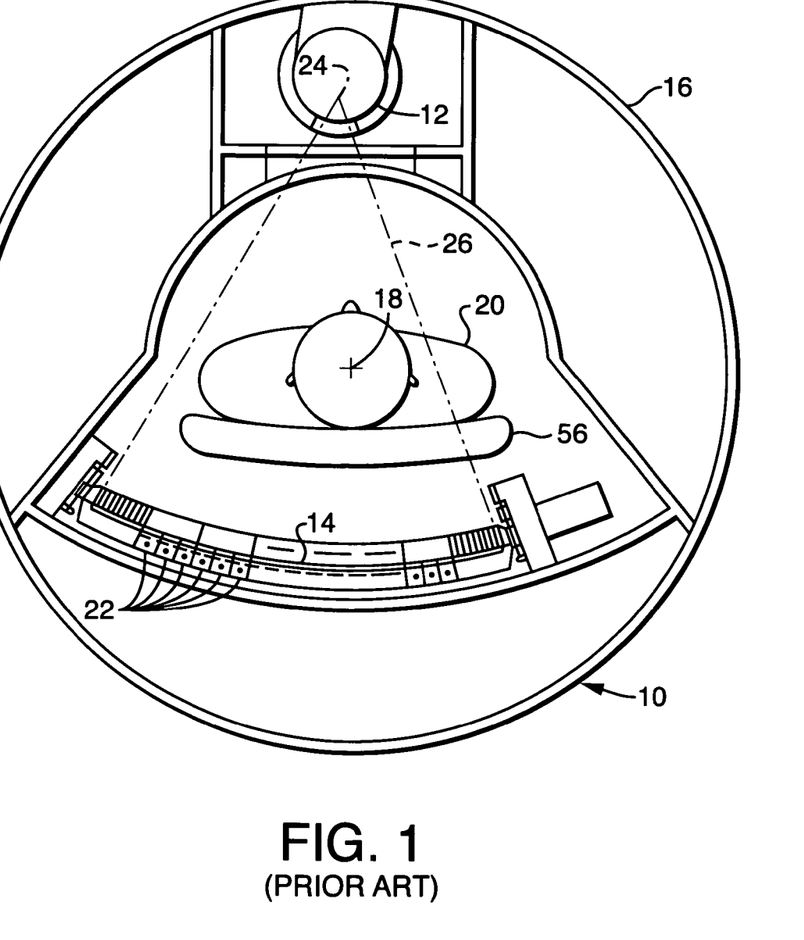
FIG. 1 is a schematic axial view of a conventional third generation CT scanner.

FIG. 1 is a schematic axial view of a conventional third generation CT scanner which includes an x-ray source 12 and an x-ray detector system 14 secured to diametrically opposite sides of an annular shaped disk 16. The disk 16 is rotatably mounted within a gantry support (not shown), so that during a scan the disk 16 continuously rotates about a longitudinal z-axis while x-rays pass from the source 12 through an object, such as a patient 20, positioned on a patient table 56 within the opening of the disk 16. The z-axis is normal to the plane of the page in FIG. 1 and intersects the scanning plane at the mechanical center of rotation 18 of the disk 16. The mechanical center of rotation 18 of the disk corresponds to the "isocenter" of the reconstructed image.

In one conventional system, the detector system 14 includes an array of individual detectors 22 disposed in a single row in a shape of an arc having a center of curvature at the point 24, referred to as the "focal spot," where the radiation emanates from the x-ray source 12. The source 12 and array of detectors 22 are positioned so that the x-ray paths between the source and each detector all lie in a "scanning plane" that is normal to the z-axis. Since the x-ray paths originate from what is substantially a point source and extend at different angles to the detectors, the diverging x-ray paths form a "fan beam" 26 that is incident on the detector array 14 in the form of a one-dimensional linear projection. The x-rays incident on a single detector at a measuring interval during a scan are commonly referred to as a "ray," and each detector generates an output signal indicative of the intensity of its corresponding ray. The angle of a ray in space depends on the rotation angle of the disk and the location of the detector in the detector array. Since each ray is partially attenuated by all the mass in its path, the output signal generated by each detector is representative of the attenuation of all the mass disposed between that detector and the x-ray source, i.e., the attenuation of the mass lying in the detector's corresponding ray path. The x-ray intensity measured by each detector is converted by a logarithmic function to represent a line integral of the object's density, i.e., the projection value of the object along the x-ray path.

The output signals generated by the x-ray detectors are normally processed by a signal processing portion (not shown) of the CT system. The signal processing portion generally includes a data acquisition system (DAS) which filters the output signals generated by the x-ray detectors to improve their signal-to-noise ratio (SNR). The output signals generated by the DAS during a measuring interval are commonly referred to as a "projection," "projection profile," or "view" and the angular orientation of the disk 16, source 12 and detector system 14 corresponding to a particular projection profile is referred to as the "projection angle."

If the detector array consists of N detectors, then N projection values are collected at each rotation angle. With the rays in a fan shape, these N projection values are collectively called a fan-beam projection profile of the object. The data of fan-beam projection profiles are often reordered or rebinned to become parallel-beam projection profiles. All rays in a parallel-beam profile have the same angle, called the parallel-beam projection view angle. The image of the object can be reconstructed from parallel-beam projection profiles over a view angle range of 180 degrees.

During a scan, the disk 16 rotates smoothly and continuously around the object being scanned, allowing the scanner 10 to generate a set of projections at a corresponding set of projection angles. In a conventional scan, the patient remains at the constant z-axis position during the scan. When obtaining multiple scans, the patient or the gantry is stepped along the longitudinal z-axis between scans. These processes are commonly referred to as "step-and-shoot" scanning or "constant-z-axis" (CZA) scanning. Using well-known algorithms, such as the inverse Radon transform, a tomogram may be generated from a set of projections that all share the same scanning plane normal to the z-axis. This common scanning plane is typically referred to as the "slice plane."

A tomogram is a representation of the density of a two-dimensional slice along the slice plane of the object being scanned. The process of generating a tomogram from the projections is commonly referred to as "reconstruction," since the tomogram may be thought of as being reconstructed from the projection data. The reconstruction process can include several steps including reordering to form parallel-beam data from the fan-beam data, convolution to deblur the data, and back projection in which image data for each image pixel is generated from the projection data. In CZA scanning, for a particular image slice, all the projections share a common scanning plane, so these projections may be applied directly for convolution and to the back projector for generation of a tomogram.

In some instances, for instance when the image consists of scans of the skull, the reconstructed images are further processed with a Beam Hardening Correction ("BHC") operation, which is used to estimate regional tissue composition. This information is then used to adjust the predicted beam hardening transformation which is a function of tissue composition. The BHC is based on the assumption of a uniform average tissue composition. A monotonic transformation is predicted or measured based upon the average tissue composition. However, this procedure can result in certain artifacts being present in the corrected image in the form of a bleeding of the bone into the adjacent soft tissue which destroys the bone-brain interface in the image. These artifacts degrade the quality of the image and, in some cases, can render the image useless for certain diagnostic purposes.

Figure 2A:
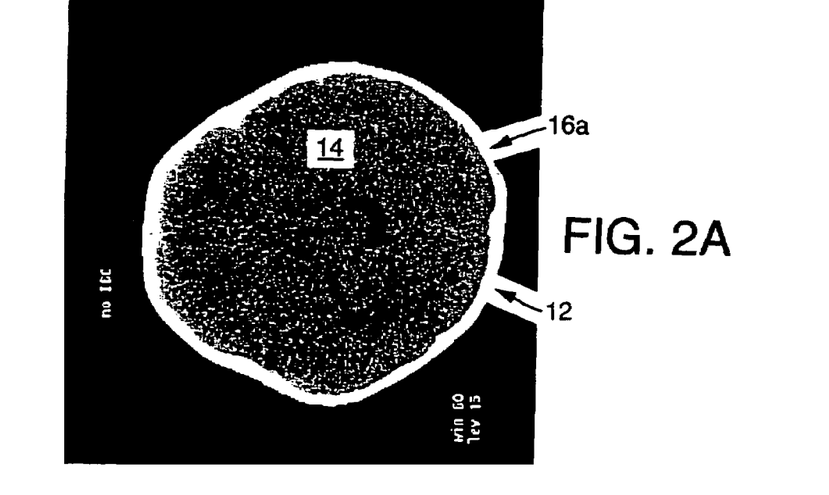
FIG. 2A-2B are reconstructed CT images of the skull of a two-year-old boy.
Figure 2B:
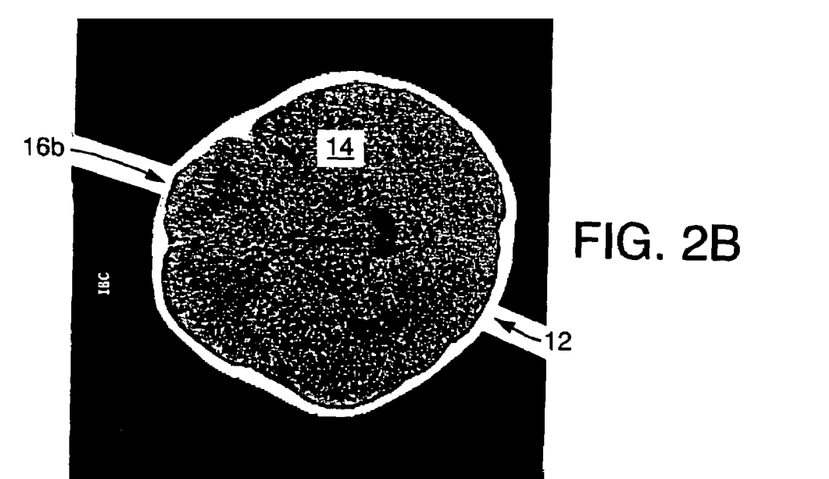

Typically, a second-pass BHC operation or an Iterative Bone Correction ("IBC") operation is performed on the BHC corrected image to compensate for the artifacts generated by the first-pass BHC. The effectiveness of the second pass correction depends on properties of the bone of the skull. It is more effective in images of adult skulls than in children's or infant skulls because of the increased density of the adult skull. Since the skull of an infant or child is less dense, the second-pass correction tends to overcorrect the image, resulting in a gap in the bone-brain interface in the image, which can equally render the image useless for diagnostic purposes. FIGS. 2A and 2B are reconstructed images of a CT scan of the skull of a two year old child. FIG. 2A shows a reconstructed image which has not had a second correction pass done. As can be seen, the first-pass correction resulted in a bleeding between the bone region of the image 12 and the brain region of the image 14, such that the bone-brain interface 16a is blurred and not easily discernable. FIG. 2B shows a reconstructed image which has had a second-pass correction performed. As can be seen, because the correction is performed at a gain which is used in bone correction operations of adult CT images, the lower density and area of the bone region 12 causes the image to be overcorrected, resulting in a gap in the bone-brain interface 16b between the bone region 12 and the brain region 14. In scans of infants (aged up to one year) the overcorrection is more pronounced, due to the low density and area of the bone in the skull.

In order to avoid the problems associated with the second pass correction in reconstructed scans, the second pass is not performed in younger patients. As stated above, in very young infants, the lack of the second pass correction does not adversely affect the scans because beam hardening is less likely to occur in the first pass correction operation. However, because of differences in the growth patterns of children, there is no clear age at which the second pass correction can be performed without resulting in some amount of overcorrection.

SUMMARY OF THE INVENTION

The present invention is directed to a method of performing a second-pass IBC operation which compensates for the differences in the bone density and area of the bone region of the patient having the scans taken. The method involves analyzing the reconstructed images and determining the bone density and area of the patient based on the reconstructed images. The determined values of the bone density and area are applied to known density and area data to determine that gain at which the second-pass correction will be performed. In a first instance, if the determined bond density is below a first bone density threshold value and the determined bone area is below a first bone area threshold value, such that an intersection point of the determined bone density and bone area values falls within a lower threshold region, then the gain of the second-pass correction operation is set to zero. In a second instance, if an intersection of the determined bone density and determined bone area falls within an upper threshold region, the gain in the second-pass correction operation is set to one. If the intersection of the determined bone density and determined bone area does not fall within either the upper threshold region or the lower threshold region, the gain of the second-pass correction operation is determined based on the distance between the intersection of the determined bone density and determined bone area and the upper and lower threshold regions.

According to one aspect of the invention, a method of performing bone correction on a computerized tomography (CT) image includes the steps of:
A. generating a reconstructed CT image of a bone-containing portion of a patient's body, the reconstructed CT image including a bone region corresponding to the bone-containing portion;
B. determining characteristics of the bone region of the image; and
C. performing a bone correction procedure on the image, the bone correction procedure being performed at a gain that is determined based on the bone region characteristics.

The bone region characteristics determined in step B may include at least one of a bone density value d and a bone area value s. The bone-containing portion of the patient's body may be the patient's skull. If the bone region characteristics fall within a first threshold region of a grid having a first axis representative of the bone density value d and a second axis representative of the bone area value s, the gain in step C may be a first gain setting of zero. If the bone region characteristics fall within a second threshold region of the grid, the gain in step C may be a second gain setting of one. If the bone region characteristics do not fall within the first threshold region of the grid nor the second threshold region of the grid, the gain in step C may be a third gain setting that is between zero and one. The first, second and third gain settings may be determined based on a relationship between (a) an intersection value of the bone density value d and the bone area value s and (b) the first and second threshold regions. The first threshold region is defined by an area of the grid enclosed by a first threshold bone density value $d_1$ and a first threshold bone area value $s_1$. The second threshold region may be an area of the grid defined by a ratio of a second threshold bone density value $d_2$ and a second threshold bone area value $s_2$. The third gain setting may be determined based on the distance between an intersection point A of the determined bone density value d and the determined bone area value s and each of the first threshold region and the second threshold region.

The third gain setting may be determined according to the equation:

$$G_3 = D_2/(D_1 + D_2);$$

where $D_1$ is the distance between the intersection point A and the second threshold region and $D_2$ is the distance between the intersection point A and the first threshold region, wherein values of $D_1$ and $D_2$ range from zero to one.

The value of $D_1$ may be determine according to the equation:

$$D_1 = \frac{|d + \alpha s - \gamma|}{\sqrt{1 + \alpha^2}}$$

where γ represents the y-intercept of a boundary of the second threshold region and α represents a scaling factor for normalizing the ratio between the units of bone density and bone area of the grid.

According to another aspect of the invention, a method of performing bone correction on a computerized tomography (CT) image includes:
A. generating a reconstructed CT image of a bone-containing portion of a patient's body, the reconstructed CT image including a bone region corresponding to the bone-containing portion;
B. determining at least one of a bone density value d and a bone area value s of the bone region of the image; and
C. performing a bone correction procedure on the image, the bone correction procedure being performed at a gain that is determined based on at least one of the bone density value d and the bone area value s of the bone region of the image;
wherein, if one of the bone density value d is greater than a predetermined bone density value $d_1$ and the bone area value s is greater than a predetermined bone area value $s_1$, the gain is set to a first value greater than 0.

If the bone density value d is less than the predetermined bone density $d_1$ and the bone area value s is less than the predetermined bone area value $s_1$, the gain is set to a second value of 0. If the bone density value d and the bone area value s satisfy the equation:

$$d + \alpha s - \gamma > 0,$$

where $\alpha$ is a scalar value and $\gamma$ is the y-intercept of the line formed by the equation, then the gain is set to a third value of 1.

DETAILED DESCRIPTION

The present invention is directed to a method of performing a bone correction operation on reconstructed CT images based on the bone density and bone area of a bone region of a patient as determined by analysis of the CT image. As described above, the present age-based method of performing bone correction in CT images cannot provide adequate images of children because of the procedure of not performing a second-pass correction if the patient is below a certain age and performing a full-strength second-pass correction if the patient is above the certain age. The inventor has realized that, because the bone density and thickness of the bone, measured as the area of bone in the CT image, determines the extent of the bleeding artifact in a full-power second-power correction, it would be advantageous to adjust the gain of the second-pass correction procedure to compensate for the amount of bone density and bone area depicted in the images.

In order to determine the average bone density and average bone area of a CT image, it is necessary to analyze each reconstructed image I at the pixel level of the image. First, each pixel is compared to a minimum bone density value b, which is a predetermined value used to set a minimum density above which the pixel is considered to represent bone in the image. For example, the value b may be set to 1,200 HU. A labeled image L is generated from the reconstructed image I as follows: If the pixel value is greater than or equal to b, the pixel is labeled a "1". If the pixel value is less than b, the pixel is labeled a "0". The bone pixel count c is then calculated according to the equation:

$$c = \sum_{i=1}^{nc} \sum_{j=1}^{nr} L(i, j); \qquad \text{Eq. (1)}$$

where nc is the number of image columns and nr is the number of image rows. Once the bone pixel count c is determined, the bone area s is determined according to the equation:

$$s = c \times dx \times dy \qquad \text{Eq. (2)}$$

where dx and dy are the pixel width and height, respectively, in mm.

The average bone density d is determined as the average value of the non-zero pixels based on the equation:

$$d = \frac{1}{c} \sum_{i=1}^{nc} \sum_{j=1}^{nr} I(i, j) L(i, j) \qquad \text{Eq. (3)}$$

Figure 3:
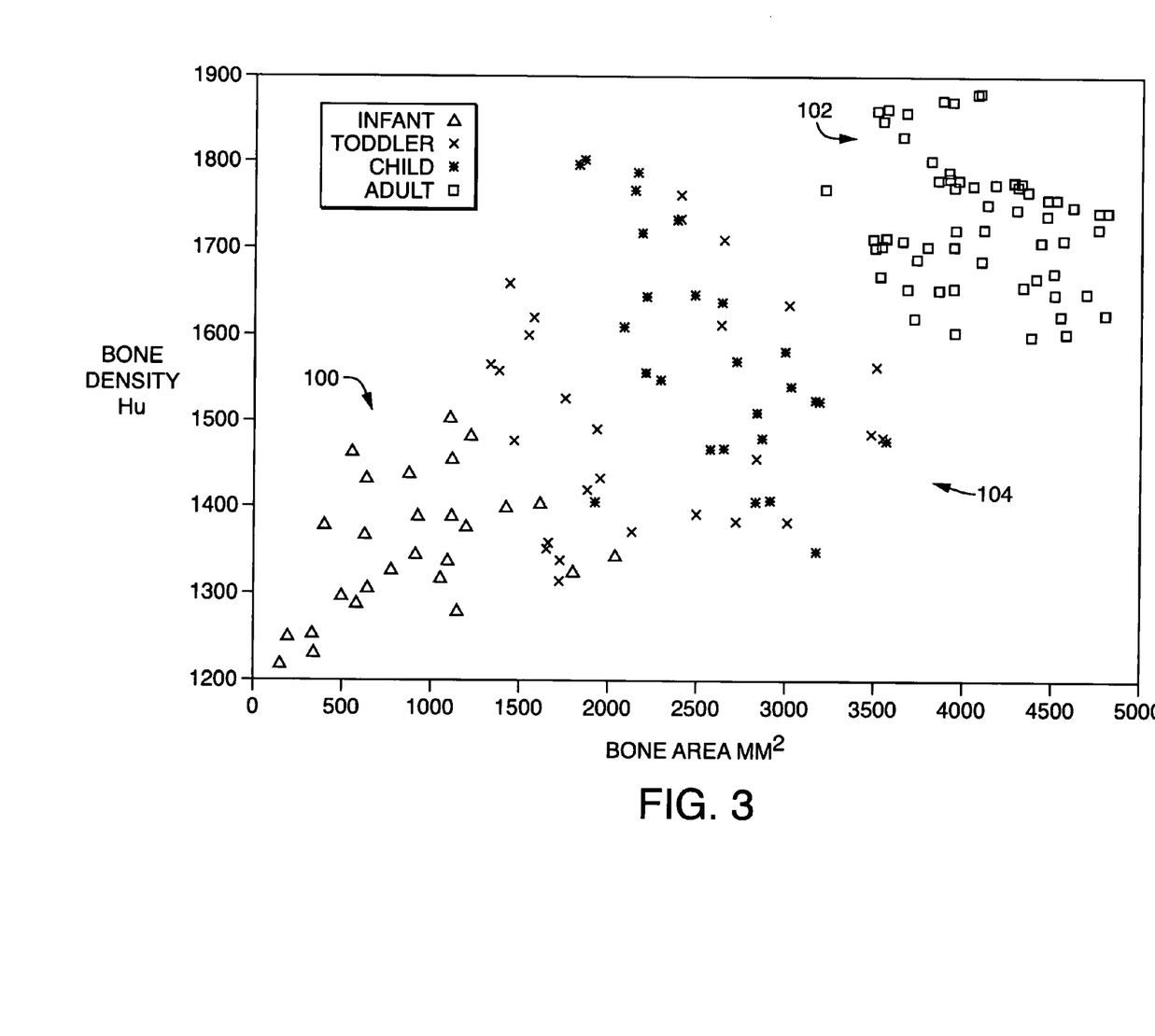
FIG. 3 is a graph showing plotted values of bone density and bone area for a number of patients.

Through the acquisition and study of numerous CT scans of infants, toddlers, children and adults, the inventor has determined that, when plotted on a graph such as the graph shown in FIG. 3, with the values of bone density d in HU along the Y-axis and the values of bone area s in mm$^2$ along the X-axis, certain data groupings occurred. In FIG. 3, the intersection of bone density and bone area data for infants up to one year old are indicated by the plus symbol "+"; intersection data for toddlers aged one to five years is shown by "X"; intersection data for children aged 5 to 12 years is shown by asterisks "*"; and intersection data for adults over 12 years is shown by squares "☐".

As shown in FIG. 3, the typical bone density readings for infants are approximately 1,500 HU or less and the typical bone area is approximately 1,500 mm$^2$ or less. This area is indicated by reference numeral 100. At the opposite corner of the graph, typical bone density readings for adults are greater than approximately 1,600 HU and typical bone area readings are greater than approximately 3,500 mm$^2$. This area is indicated by reference numeral 102. However, intersection data for toddlers and children is intermingled in the area between the infant area 100 and the adult area 102 in area 104 of the graph of FIG. 3.

Figure 4:
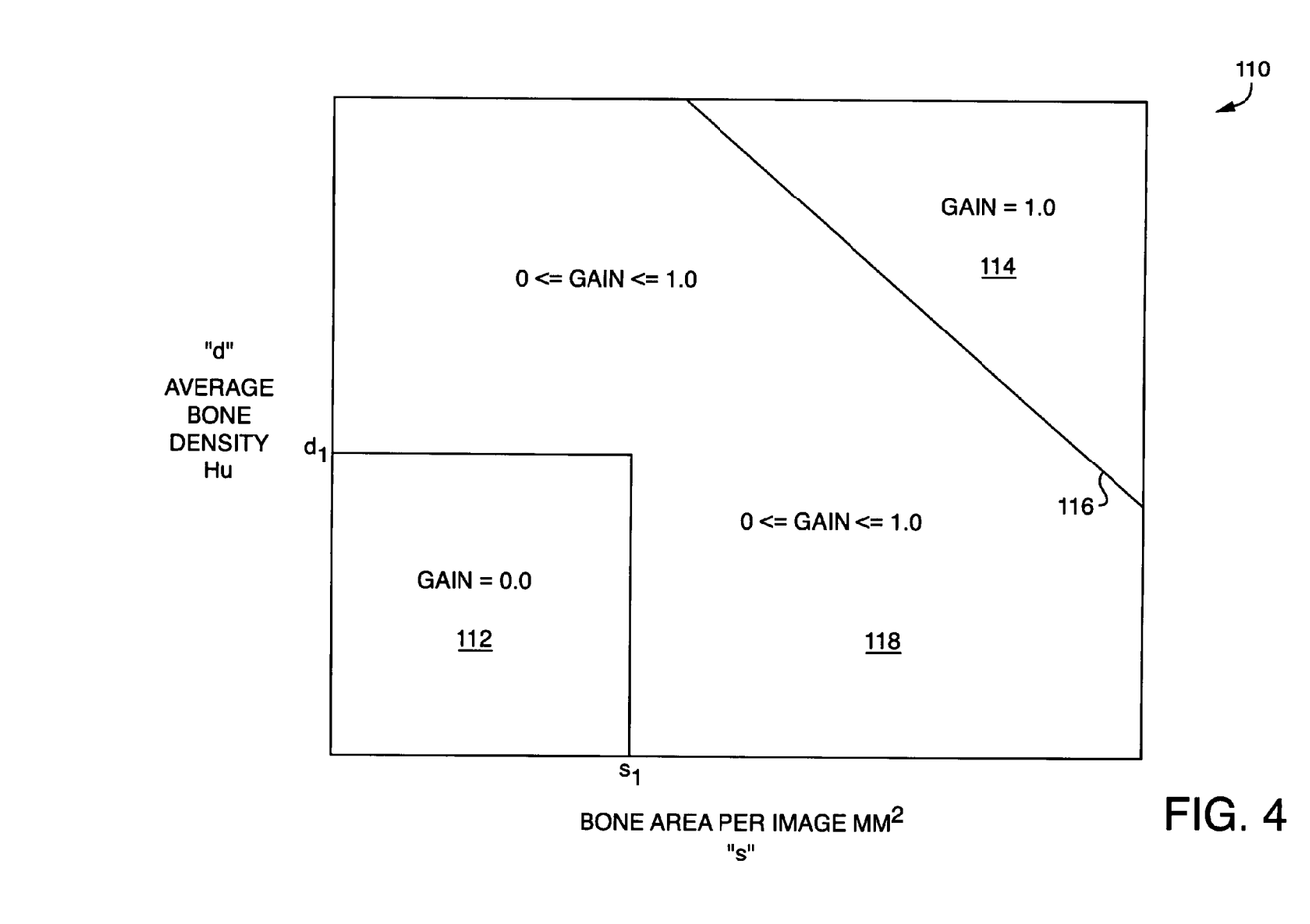
FIG. 4 is a chart showing the gain regions of the present invention.

Based on the information shown in FIG. 3, the method of the present invention includes determining the amount of gain of the second-pass bone correction procedure that will be applied to a CT image as a result of the bone density and bone area shown in the particular CT image. FIG. 4 is a chart that shows the amount of gain that is to be applied to the second-pass bone correction procedure. A first area 112, which generally encloses the infant intersection data shown in FIG. 3, is an area where, if the bone density and bone area determined from a particular CT image falls within this area, a gain of 0.0 will be applied to the second-pass bone correction procedure. In other words, if the average bone density d is determined to be less than or equal to a threshold density $d_1$ and the average bone area s is determined to be less than or equal to a threshold area $s_1$, a gain of 0.0 is applied. In the graph of FIG. 3, $d_1$ equals 1,500 HU and $s_1$ equals 1,500 mm$^2$. The gain of 0.0 is necessary due to the fact that, because of the low density and area in the patient's skull, as measured from the image, the less effect the bone will have on the first-pass bone correction procedure.

Figure 5A:
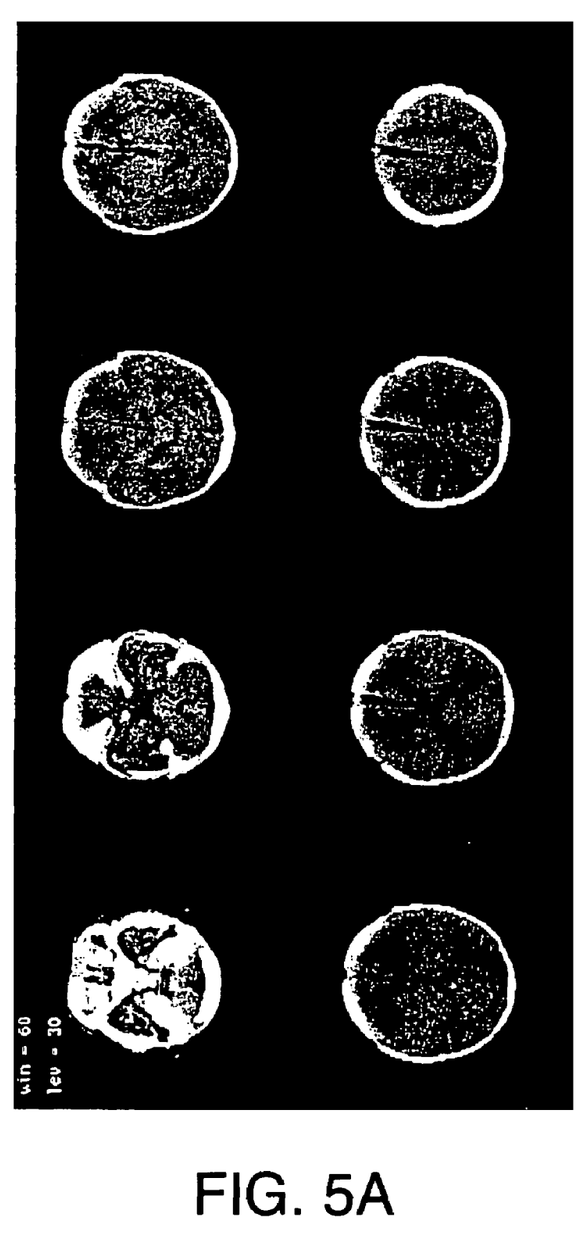
FIG. 5A is a series of uncorrected reconstructed images of a five-day-old child.
Figure 5B:
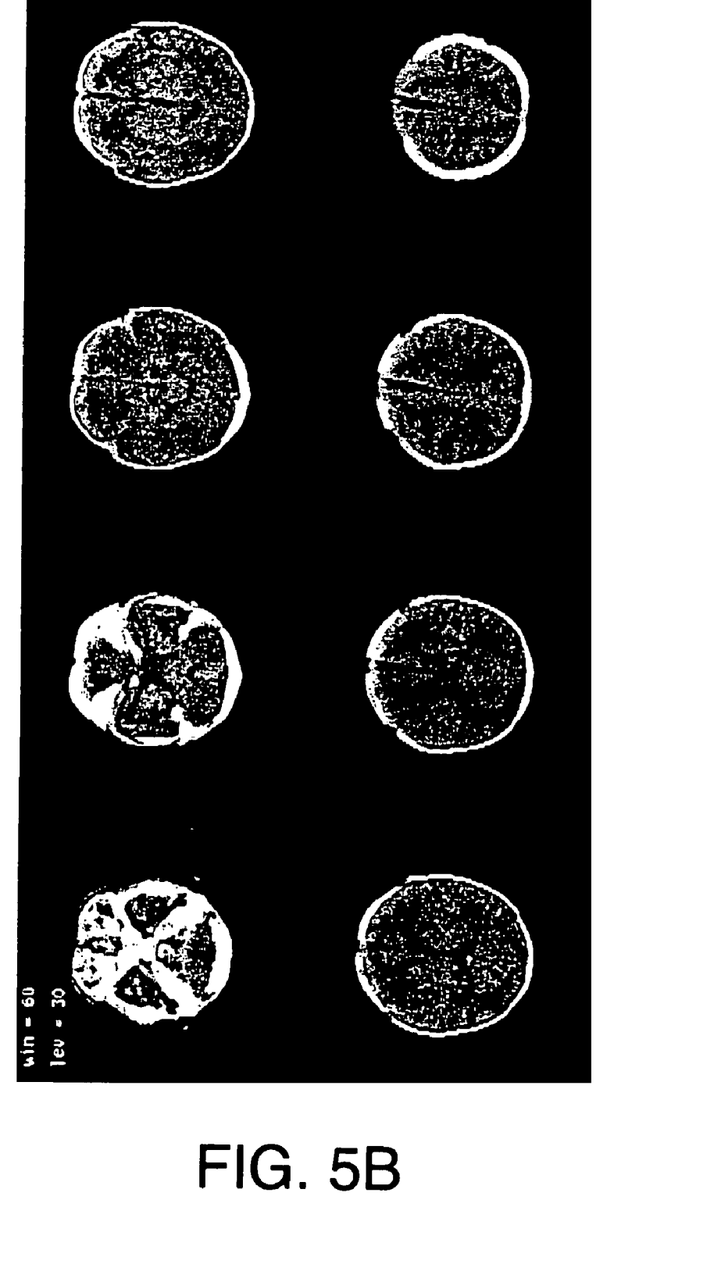
FIG. 5B is a series of fully corrected reconstructed images of a five-day-old child.

As shown in FIG. 5A, which is a series of CT scans of the skull of a five day-old infant with the gain of the second-pass bone correction set to 0.0, the bone-brain interface is clear, with little or no bleeding artifacts or overcorrection-induced gaps. For comparison, FIG. 5B shows the same series of CT scans after a second-pass bone correction procedure with a gain set at 1.0 has taken place. Note the overcorrection-induced gaps at the bone-brain interface.

A second area 114 of the chart 110 of FIG. 4, which generally includes the adult intersection data shown in FIG. 3, is an area where, if the bone density and bone area determined from a particular CT image falls within this area, or above the line 116, which acts as a lower boundary of the area 114, a gain of 1.0 will be applied to the second-pass bone correction procedure. The increased bone density and bone area of the adult skull requires that a full power second-pass bone correction from the first-pass bone correction. The intersection of the calculated values of d and s falls within area 114 if the following equation is satisfied:

$$d+\alpha s-\gamma>0, \qquad \text{Eq. (4)}$$

where $\alpha$ is a scalar that normalizes the units of HU and mm$^2$ of the graph and $\gamma$ is the Y-intercept of the line. In the example shown in FIG. 3, $\alpha=0.2$ HU/mm$^2$ and $\gamma=2,300$ HU.

If the calculated value of either d is greater than $d_1$ or the calculated value of s is greater than $s_1$, and $d+\alpha s-\gamma \leq 0$, the intersection of the values falls within area 118. In this case, the value of the gain of the second-pass bone correction procedure will vary depending on the location of the intersection relative to areas 112 and 114. Generally, the value G of the gain which will be applied to the second-pass bone correction is calculated according to the equation:

$$G = \frac{D_1 G_2 + D_2 G_1}{D_1 + D_2} \qquad \text{Eq. (5)}$$

where $D_1$ is the distance from the intersection of the calculated values d and s and the boundary of area 114 as defined by Eq. 4, $D_2$ is the distance from the intersection of the calculated values d and s and the boundary of area 112 as defined by the threshold values $d_1$ and $s_1$, $G_1$ is the gain applied within area 114 and $G_2$ is the gain applied within area 112. Given that $G_1$ is set to 1.0 and $G_2$ is set at 0.0, Eq. (5) can be reduced to:

$$G=D_2(D_1+D_2). \qquad \text{Eq. (6)}$$

The value of $D_1$ is determined according to the equation:

$$D_1 = \frac{|d+\alpha s - \gamma|}{\sqrt{1+\alpha^2}} \qquad \text{Eq. (7)}$$

and the value of $D_2$ is determined according to the equation:

$$D_2 = \begin{cases} \alpha(s-s_1) & \text{if } d<d_1 \\ d-d_1 & \text{if } s<s1 \\ \sqrt{\alpha^2(s-s_1)^2+(d-d_1)^2} & \text{Otherwise} \end{cases} \qquad \text{Eq. (8)}$$

Figure 6A:
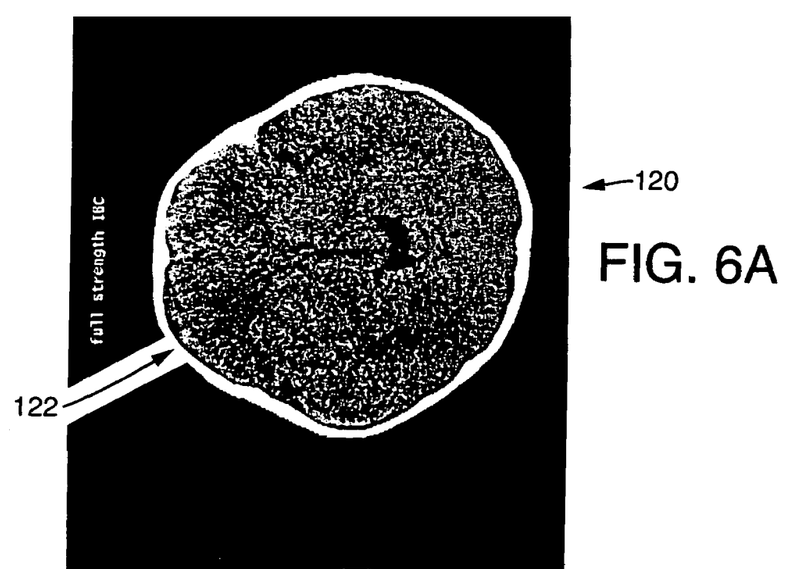
FIG. 6A is a fully corrected reconstructed image of a two-year-old child.
Figure 6B:
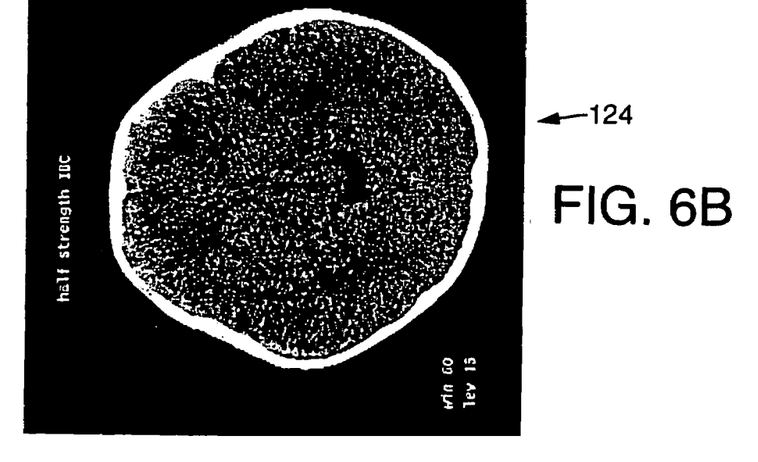
FIG. 6B is a reconstructed image of a two-year-old child which has been bone-corrected in accordance with the present invention.

FIGS. 6a and 6B each show a CT image slice of the skull of a two-year-old child. Shown at 120 of FIG. 6A is the CT image after a full power (G=1.0) second-pass bone correction procedure. This is the same CT image as shown in FIG. 2B. As can be clearly seen in FIG. 6A, the full-power correction results in a gap 122 at the bone-brain interface, which, as described above, is undesirable for diagnostic purposes. Shown at 124 in FIG. 6B is the same CT image slice after a second-pass bone correction procedure at a gain G of 0.5, which is determined based on the calculated d and s values as described above. In FIG. 6B, the bone-brain interface is clear with no gaps caused by overcorrection or bone-brain bleeding caused by undercorrection. The result is a bone-corrected CT image which is optimized for diagnostic purposes.

Figure 7A:
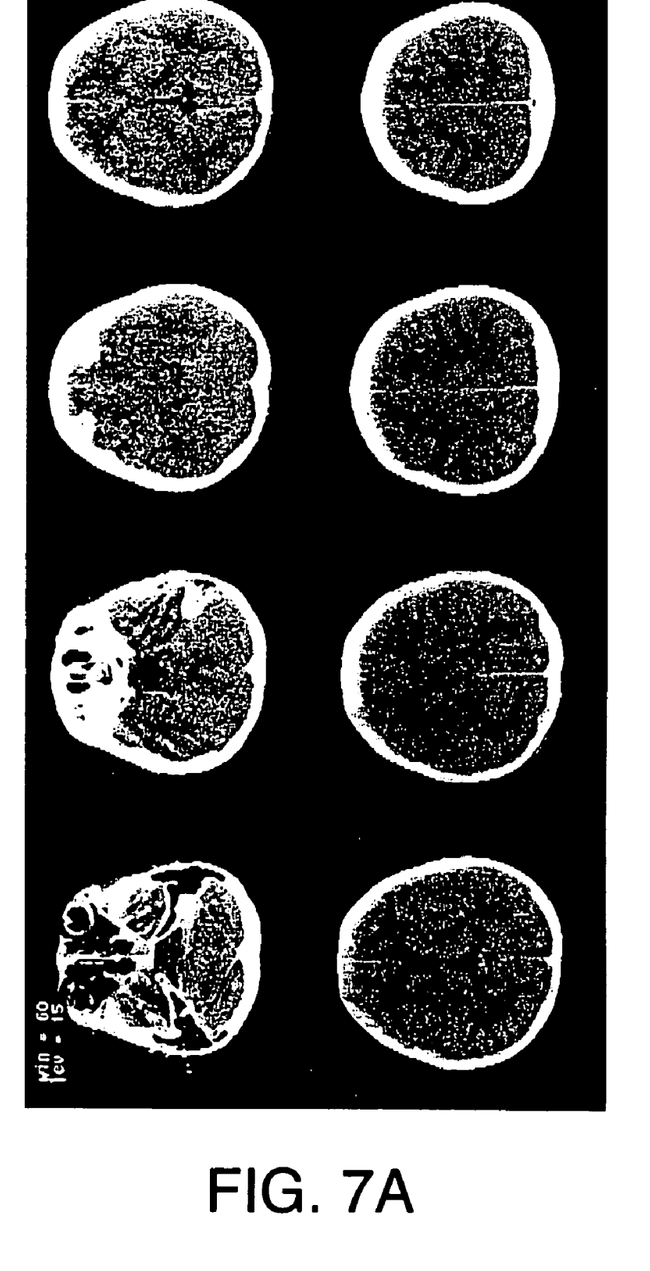
FIG. 7A is a series of uncorrected reconstructed images of a nine-year-old child.
Figure 7B:
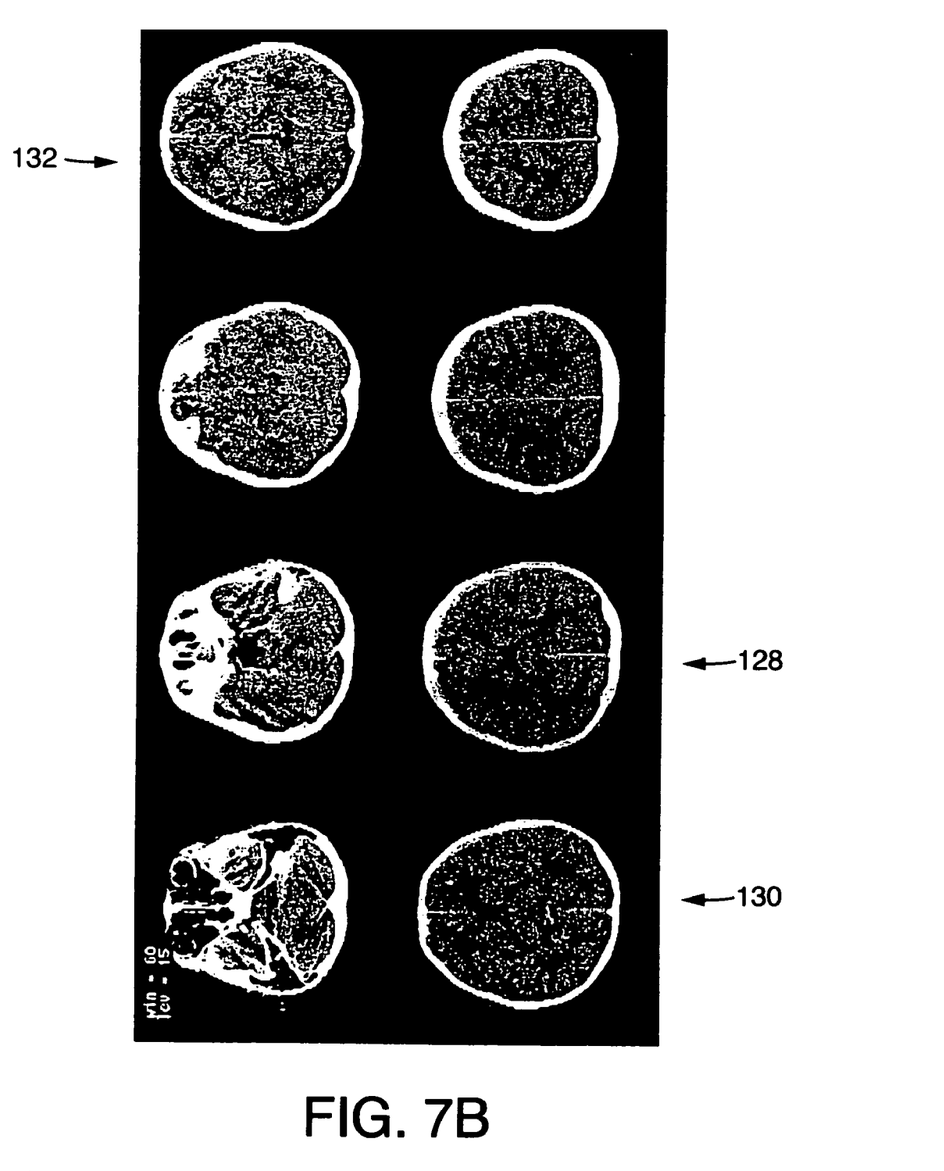
FIG. 7B is a series of fully corrected reconstructed images of a nine-year-old child.
Figure 7C:
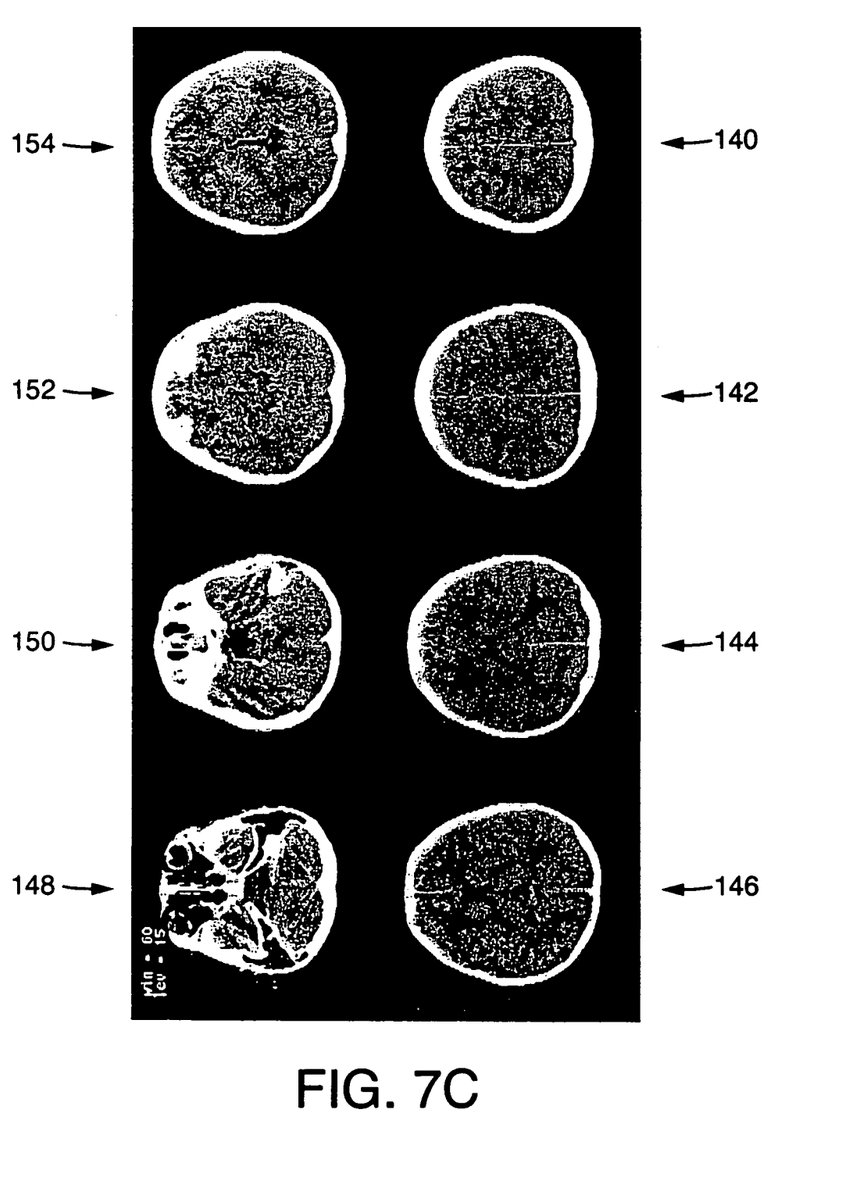
FIG. 7C is a series of reconstructed images of a nine-year-old child which has been bone-corrected in accordance with the present invention.

As a further example of the effectiveness of the method of the invention, FIGS. 7A–7C show three different versions of the same set of CT reconstructed images of the skull of a nine-year-old child. FIG. 7A shows the CT images with the gain of the second-pass bone correction procedure set to 0.0. Clearly, significant bone-brain bleeding can be seen in these images. FIG. 7B shows the CT images with the gain of the second-pass bone correction procedure set to 1.0. In this example, the calculated d and s values of this patient fall very close to, but not within, area 114 of the chart of FIG. 4. Therefore, some overcorrection is present in these images, as seen in slices 128, 130 and 132. FIG. 7C shows the CT images with the gain of the second-pass bone correction procedure set to different levels for each image, the level for a particular image being based on the bone density and bone area calculations for that image. In FIG. 7C, image 140 is the result of the second-pass bone correction procedure performed at a gain of 0.54; image 142, at a gain of 0.50; image 144, at a gain of 0.44; image 146, at a gain of 0.47; image 148, at a gain of 0.46; image 150, at a gain of 0.53; image 152, at a gain of 0.57; and image 154, at a gain of 0.25.

In this set of images, the bone-brain interface is properly corrected, and the images are optimized for diagnostic purposes.

Figure 8:
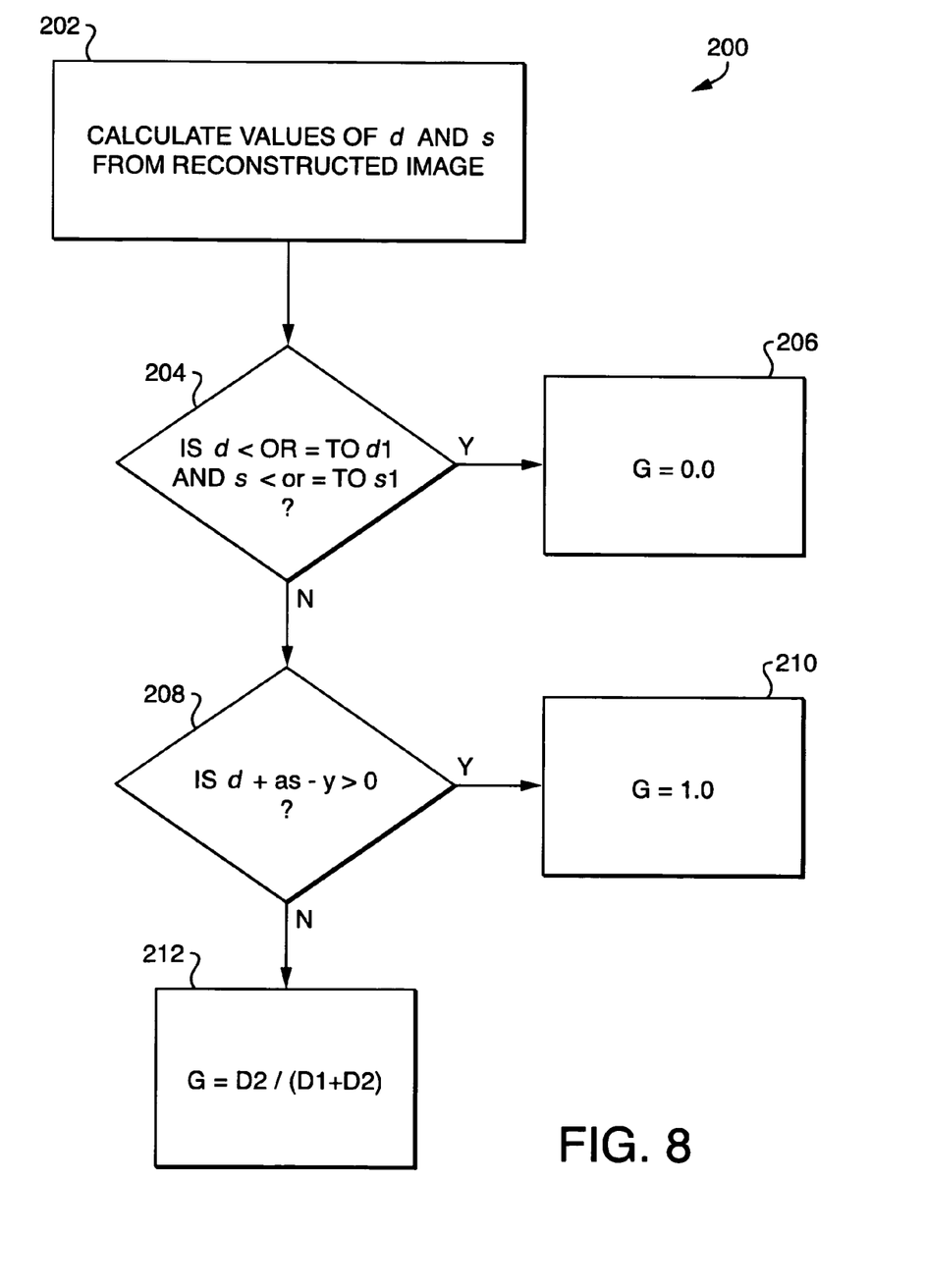
FIG. 8 is a flow diagram showing the steps involved in the bone correction process of the present invention.

FIG. 8 is a flow diagram 200 that shows the steps taken in the process described above. In step 202, the values of d and s are calculated from the reconstructed image as described above. If $d \leq d_1$ and $s \leq s_1$, step 204, then the gain G of the second-pass bone correction procedure is set to 0.0, step 206. If $d > d_1$ and/or $s > s_1$, step 204, step 208 is carried out, in which it is determined whether the equation $d+\alpha s-\gamma>0$ is true. If it is, the gain G is set to 1.0, step 210. If it not, the gain G is determined according to the equation $G=D_2/(D_1+D_2)$, step 212.

Accordingly, the invention provides an improved method for performing bone correction on reconstructed CT images. The gain at which a second-pass bone correction procedure is done is determined based on the bone density and bone area values obtained from the CT reconstructed image. If the calculated bone density and bone area values fall within a first range, the gain is set to 0.0. If the calculated bone density and bone area values fall within a second range, the gain is set to 1.0. If the calculated bone density and bone area values fall within a third range, between the first and second ranges, the gain is calculated based on a relative distance of the intersection values of the bone density and area from the first and second ranges. This process may be carried out in an automated fashion.

The invention may be embodied in other specific forms without departing from the spirit or essential characteristics thereof. While the description and CT images address and describe scans of the skull, it will be understood that CT images of any region of the body that include a bone/flesh interface may be processed in the described manner according to the invention. Furthermore, images generated by any type of CT image generators, such as multi-row CT scanners, maybe processed according to the present invention. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method of performing bone correction on a computerized tomography (CT) image, comprising:
   A. generating a reconstructed CT image of a bone-containing portion of a patient's body, the reconstructed CT image including a bone region corresponding to the bone-containing portion;
   B. determining characteristics of the bone region of the image, wherein the bone region characteristics include at least one of a bone density value d and a bone area value s; and
   C. performing a bone correction procedure on the image, the bone correction procedure being performed at a gain that is determined based on the bone region characteristics
   wherein, if the bone region characteristics fall within a first threshold region of a grid having a first axis representative of the bone density value d and a second axis representative of the bone area value s, the gain in step C is a first gain setting of zero;
   wherein, if the bone region characteristics fall within a second threshold region of the grid, the gain in step C is a second gain setting of one;
   wherein, if the bone region characteristics do not fall within the first threshold region of the grid nor the second threshold region of the grid, the gain in step C is a third gain setting that is between zero and one;
   wherein the first, second and third gain settings are determined based on a relationship between (a) an intersection value of the bone density value d and the bone area value s and (b) the first and second threshold regions;
   wherein the first threshold region is defined by an area of the grid enclosed by a first threshold bond density value $d_1$ and a first threshold bone area value $s_1$;
   wherein the second threshold region is an area of the grid defined by a ratio of a second threshold bone density value $d_2$ and a second threshold bone area value $s_2$;
   wherein the third gain setting is determined based on the distance between an intersection point A of the determined bone density value d and the determined bone area value s and each of the first threshold region and the second threshold region;
   wherein the third gain setting is determined according to the equation:

$$G_3 = D_2/(D_1 + D_2);$$

where $D_1$ is the distance between the intersection point A and the second threshold region and $D_2$ is the distance between the intersection point A and the first threshold region; and
   wherein the value of $G_3$ ranges from zero to one.

2. The method of claim 1, wherein the value of $D_1$ is determine according to the equation:

$$D_1 = \frac{|d + \alpha s - \gamma|}{\sqrt{1+\alpha^2}};$$

where $\gamma$ represents the y-intercept of a boundary of the second threshold region and $\alpha$ represents a scaling factor for normalizing the ration between the units of bone density and bone area of the grid.

3. The method of claim 2, wherein the value of $D_2$ is determined according to the equation:

$$D_2 = \begin{cases} \alpha(s - s_1) & \text{if } d < d_1 \\ d - d_1 & \text{if } s < s1 \\ \sqrt{\alpha^2(s-s_1)^2 + (d-d_1)^2} & \text{Otherwise.} \end{cases}$$

4. A method of performing bone correction on a computerized tomography (CT) image, comprising:
   A. generating a reconstructed CT image of a bone-containing portion of a patient's body, the reconstructed CT image including a bone region corresponding to the bone-containing portion;
   B. determining at least one of a bone density value d and a bone area value s of the bone region of the image; and
   C. performing a bone correction procedure on the image, the bone correction procedure being performed at a gain that is determined based on at least one of the bone density value d and the bone are value s of the bone region of the image;
   wherein (a) if one of the bone density value d is greater than a predetermined bone density value $d_1$ and the bone area value s is greater than a predetermined bone area value $s_1$, the gain is set to a first value greater than 0, and (b) if the bone density value d and the bone area value s satisfy the equation:

$d+\alpha s-\gamma>0$, where $\alpha$ is a scalar value and $\gamma$ is the y-intercept of the line formed by the equation, then the gain is set to a second value of 1.

5. A method of performing bone correction on a computerized tomography (CT) image comprising:
   A. generating a reconstructed CT image of a bone-containing portion of a patient's body, the reconstructed CT image including a bone region corresponding to the bone-containing portion;
   B. determining at least one of a bone density value d and a bone area value s of the bone region of the image; and
   C. performing a bone correction procedure on the image, the bone correction procedure being performed at a gain that is determined based on at least one of the bone density value d and the bone area value s of the bone region of the image;
   wherein, (a) if one of the bone density value d is greater than a predetermined bone density value $d_1$ and the bone area value s is greater than a predetermined bone area value $s_1$, the gain is set to a first value greater than 0; (b) if the bone density value d is less than the predetermined bone density $d_1$ and the bone area value s is less than the predetermined bone area value $s_1$, the gain is set to a second value of 0; and (c) if the bone density value d and the bone area value s satisfy the equation:

$d+\alpha s-\gamma>0$, where $\alpha$ is a scalar value and $\gamma$ is the y-intercept of the line formed by the equation, then the gain is set to a third value of 1.

* * * * *